United States Patent                            [11] 3,604,002

| [72] | Inventor | John J. Fling<br>Malibu, Calif. |
|---|---|---|
| [21] | Appl. No. | 865,689 |
| [22] | Filed | Oct. 13, 1969 |
| [45] | Patented | Sept. 7, 1971 |
| [73] | Assignee | International Telephone and Telegraph Corporation<br>New York, N.Y. |

[54] IMPLICIT BEAM ANGLE CONTROL FOR A FREQUENCY SCANNING RADAR SYSTEM
10 Claims, 3 Drawing Figs.

[52] U.S. Cl. .................................................. 343/100 SA,
   331/9, 343/854
[51] Int. Cl. .................................................. H01q 3/22,
   H03b 3/04
[50] Field of Search .................................... 331/9;
   343/100 SA, 854

[56]          References Cited
         UNITED STATES PATENTS
| 2,757,340 | 7/1956 | Cauchois | 331/9 X |
| 3,116,463 | 12/1963 | Singer | 331/9 |
| 3,434,139 | 3/1969 | Algeo | 343/100 SA X |

Primary Examiner—T. H. Tubbesing
Attorneys—C. Cornell Remsen, Jr., Walter J. Baum, Paul W. Hemminger, Percy P. Lantzy and Thomas E. Kristofferson ABSTRACT: A folded waveguide serpentine transmission line is used as a reference element in a phase-lock loop arrangement for vernier adjustment of programmed frequency steps generated to produce frequency scanning using an antenna arrangement having a beam pointing angle which is a function of frequency.

A controllable oscillator such as a backward wave oscillator is coarse programmed in accordance with a voltage staircase, each staircase step corresponding to a discrete beam-pointing angle. The said reference serpentine is designed to be an integral number of wavelengths long at each discrete frequency and corresponding beam-pointing angle. The phase-lock loop instantaneously detects errors from the aforesaid even integral wavelength relationship across the reference serpentine (equivalent to a $2\pi$ serpentine output) and vernier adjusts the backward wave oscillator frequency to produce accurate locking at a $2\pi$ radian increment for each frequency step.

A controllable phase shifter in series with the reference serpentine operates to introduce a predetermined selected phase offset for scan interlacing.

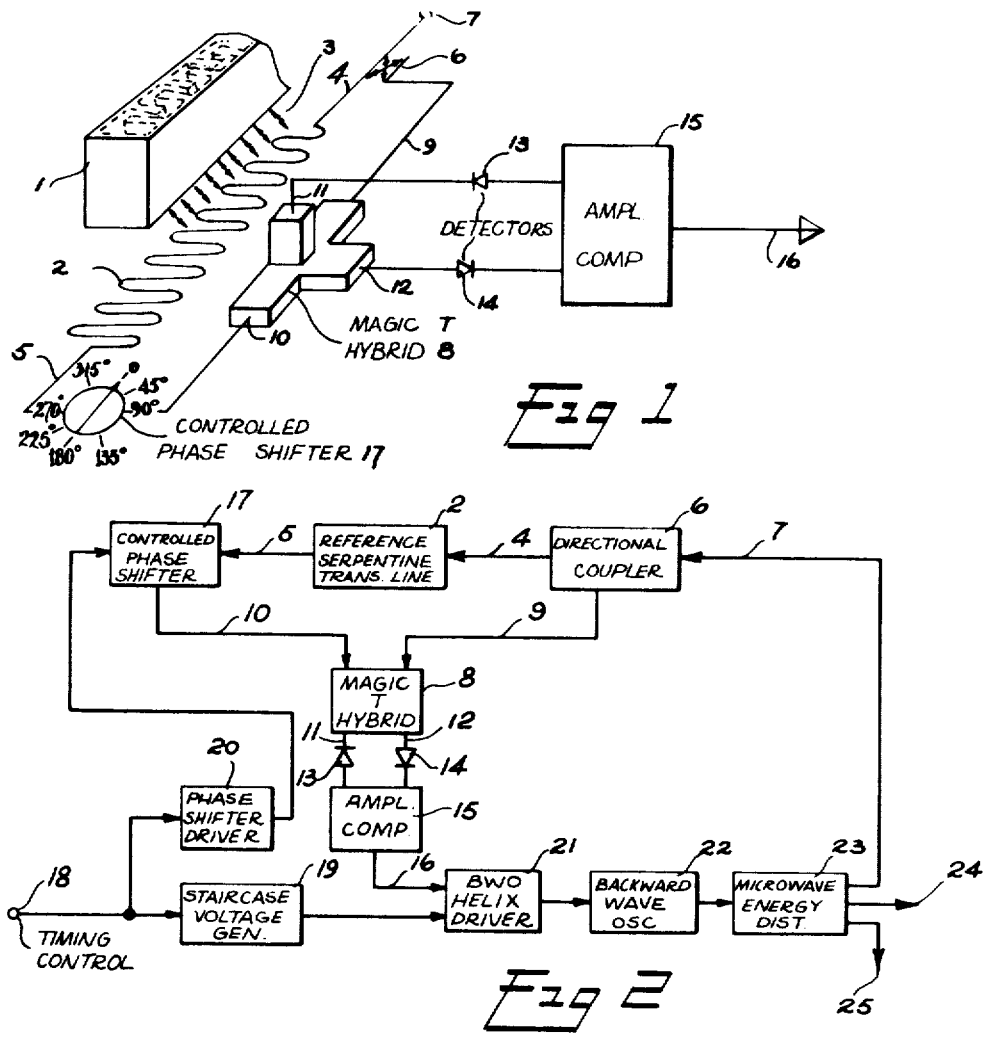
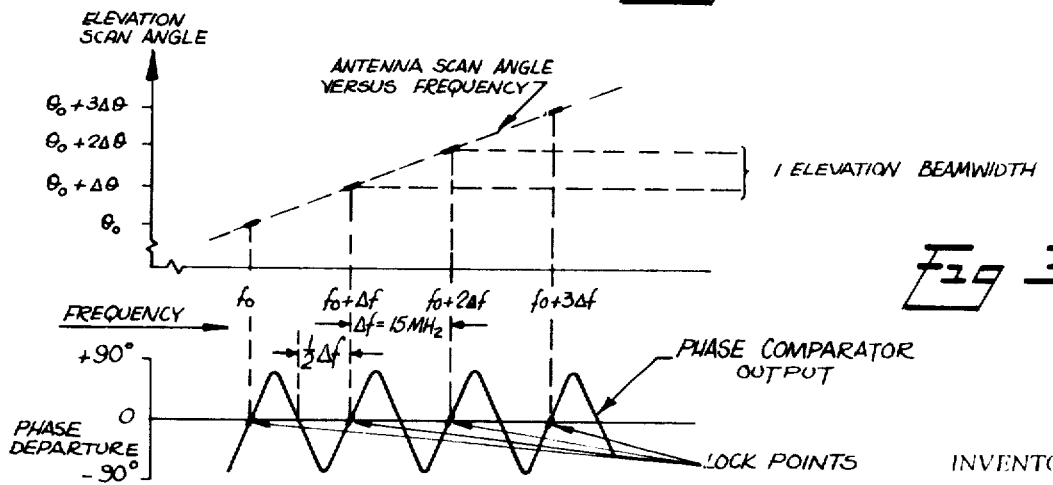
INVENTOR.
JOHN J. FLING

IMPLICIT BEAM ANGLE CONTROL FOR A FREQUENCY SCANNING RADAR SYSTEM

BACKGROUND OF THE INVENTION

1. Field of the Invention

The invention relates to radar systems and more particularly to scan program-generating systems in frequency-scan radar equipment.

2. Description of the Prior Art

In the prior art, there are a number of systems and variations on the general concept of frequency scanning. Primarily, a frequency scan radar employs an antenna array which has a shapely directive radiation pattern characteristic, the beam-pointing angle of which varies over a predetermined scan sector of interest as the frequency of the microwave excitation energy is varied. Such systems are alluded to in U.S. Pat. No. 3,438,035; also, U.S. Pat. No. 3,039,097 depicts another type of antenna system responsive to frequency to produce inertialess scanning. From these two references, it will be understood that the use of folded or serpentine-shaped waveguide transmission lines as feedlines for the elements of frequency sensitive arrays is known in this art, as a means lengthening the electrical path within the transmission line between radiators, while maintaining a smaller radiating element spacing in air. Such an expedient is a valuable approach to the design of frequency sensitive scanning arrays having predetermined scanning sensitivities.

In some prior art systems, the successive scan angles which it is desired to program into a frequency scan system are generated through the synthesis of a program of discrete highly stable frequency steps in open loop fashion corresponding to each desired beam pointing angle and each interlace pointing angle. Generally, the frequency synthesizer function in such a system must be very elaborately instrumentated with a very large number of individually controlled oscillators, mixing circuits, filters and gating logic circuits. In order to achieve adequate stability, such oscillators are operated at relatively low radio frequencies. Accordingly, complex frequency multiplication circuits must be included.

It will be understood that these prior art frequency synthesis systems are elaborate and, therefore, expensive to construct. The present invention, on the other hand, provides for implicit generation of the required frequency program in a manner which obviates most of the aforementioned elaborate instrumentation. The manner of accomplishing the novel improvements will be apparent as this description proceeds.

SUMMARY OF THE INVENTION

In view of the recited prior art disadvantages, it may be said that the general object of the present invention was the development of a relatively simple system for generation of a program of radio frequencies for scan programming in a frequency scan radar.

In general, the frequency sensitive array, such as shown in U.S. Pat. No. 3,438,035, is designed to be frequency sensitive only in one plane. In U.S. Pat. No. 3,039,097, the same is true, although beam forming is effected in the orthogonal plane by means of a reflector, whereas the array in U.S. Pat. No. 3,438,035 is essentially a two-dimensional array capable of forming a suitably narrow beam in both the azimuth and elevation polar coordinates.

If the frequency-controlled scan is to be applied in the elevation sector scan, for example, it will be noted that the angle of the beam is placed in accordance with the phase distribution of energy progressing from one end of the array to the other. The serpentine waveguide feed is, in general terms, an "extended path" waveguide transmission line designed to increase the electrical path length within this waveguide feed from element-to-element, while maintaining a smaller external spacing between adjacent radiating elements for array design reasons. In antenna systems of this type, it is well known that the directive beam formed in a plane is positioned at an angle which is a function of the frequency of the energy of excitation.

The present invention may be said to operate on a corollary of this same principle. An additional, or auxiliary waveguide serpentine, is provided and is excited from the same variable frequency signal source as is the scanning serpentine/array. This auxiliary, or reference serpentine, is designed to be a comparatively large number of wavelengths in total electrical length (comparable to the total electrical length of the main scanning array serpentine). The reference serpentine moreover, is designed to change its total electrical length by $2\pi$ radians for each desired successive antenna pointing angle change. Each of these changes might logically be equal to one beam width of the scanning beam, although the system is not limited to that relationship. It is only necessary that the reference serpentine, when excited from the aforementioned energy source, change its electrical length by the said $2\pi$ radians (i.e., deliver an output signal at its nonexcitation end which is $2\pi n$ radians more or less, than that corresponding to the last beam width position). This change of electrical length is in terms of cycles of excitation energy at a new frequency, the transit time of the line does, of course, not change. Unlike the main serpentine scanning array, the reference, or auxiliary serpentine, has no radiators, but is constructed to have the same electrical length vs. temperature characteristics as the said main serpentine; thus, placed in the same temperature environment, the effect of temperature on the frequency vs. scan angle relationship of the scanning array is thereby eliminated, or at least substantially reduced.

If a voltage controlled variable frequency oscillator is provided for energizing a reference serpentine and, indirectly, also the main scanning serpentine array, the frequency of this oscillator may be programmed stepwise so that each step approximately produces the said $2\pi$ radian reference serpentine output signal phase change. In that way, a multiple phase null system is provided, and a phase-lock loop circuit may be introduced to recognize any error and generate a frequency correction signal to modify each step of the frequency control signal provided to the variable frequency oscillator by the step programmer. In this way, the very accurate correspondence between beam angle and frequency of excitation required of an accurate frequency-scanning system is achieved. Moreover, it may be said that the required frequency for each scanning step has been implicitly generated from reliance on the overall electrical length of a transmission line (serpentine) waveguide of characteristics, matching the main scanning array serpentine transmission line as aforesaid.

A controlled phase shifter inserted in series with the said reference serpentine provides a means of introducing offsets into the frequency scan program, such as would be required for an interlace scan. Such a controlled phase shifter may be responsive to electrical signals and capable of being changed rapidly (may be of the digital type for accurate phase shift setting).

A detailed description of the essential components for effecting these results will be more fully set forth in the detailed description to follow.

BRIEF DESCRIPTION OF THE DRAWINGS

FIG. 1 is a semipictorial and block diagram of the reference serpentine and phase comparison components.

FIG. 2 is an overall block diagram of the implicit frequency scan program generating system.

FIG. 3 is a graphic representation of the reference serpentine phase output as related to antenna scan (beam pointing) angle.

DESCRIPTION OF THE PREFERRED EMBODIMENT

Referring now to FIG. 1, the reference serpentine waveguide 2 is shown in thermal communication with a main scanning array serpentine 1. The arrows 3 are intended to indicate this thermal association, which might be effected by mutual connection to a common heat sink, or might be the result of enclosure in a common radome to enclose air surrounding both. The variable frequency signal introduced at 7 is fractionated by the directional coupler at 6, and a portion of that signal directed toward 4 is supplied to one input arm of the Magic T hybrid 8 on the lead 9. The other Magic T input arm at 10 is supplied from the output or nonexcitation end of the reference serpentine 2 by a lead 5, and, as illustrated, through the controlled phase shifter 17.

As is well known, the output arms 11 and 12 of the typical Magic T 8, provide signals representative of the phase difference between 9 and 10. Detectors 13 and 14 operate to remove the carrier frequency from this output at 11 and 12, thereby providing bipolar error signals into the amplitude comparator 15. Such a bipolar signal is of one sense if the phase of Magic T input 9 leads 10, and of another sense if the vice versa condition prevails. Thus, the output at 16 provides a frequency control signal which will be discussed additionally as this description proceeds.

Referring now to FIG. 2, the previously described elements 2, 6, 8, 15 and 17 will be recognized. The backward wave oscillator 21 is a suitable microwave generator which is responsive to step voltage control of its frequency. A master timing control signal is applied at 18, such a signal being generated by known techniques, in accordance with system requirements and would, for example, provide a triggering signal corresponding to each step change in the voltage output of the staircase voltage generator 19. Circuitry is also readily included in 19 for reset of the staircase output voltage of 19 at the end of each angle scan programmed. A phase shift driver 20 can also include counters or other logical circuitry, as well as power amplification for control of 17, in accordance with a predetermined scan program. This controlled phase shifter 17 has been experimentally implemented, using waveguide hybriding devices, and electronic switching control. Two of four hybrid function ports contained two shorts each, one such short was fixed and the other electrically controlled by a PIN diode installed within the waveguide. The PIN diode provides the required microwave energy switching and the overall result for an electronic control of the insertion phase of 17. Various electronically controlled phase shifters using these and other techniques (such as ferrites) are known per se and adapted to provision of the function of 17.

The Magic T hybrid 8, the detectors 13 and 14, and the amplitude comparator 15 comprise the main elements of a phase-comparing means for implementing the phase-lock loop which may be said to begin at the reference serpentine leads 4 and 5, and includes the path through the said phase-comparing means, the correction signal 16, the backward waveguide oscillator helix drive 21, the backward wave oscillator 22, the microwave energy distributor 23, and the frequency input signal for the serpentine 2 on leads 7 and 4, via the directional coupler 6.

The backward wave oscillator is subject to frequency control in accordance with a voltage pattern applied to its helix in a well-known manner. Since the correction control signal on 16 is in the nature of a vernier, it is mixed with the output of the staircase generator 19 in the helix driver 21. The microwave energy distributor which properly includes a power divider, also provides output 24 for application to power amplifiers and ultimately to the main serpentine array 1 from lead 24. From lead 25, the backward wave oscillator signal may be supplied to a heterodyne circuit for producing a receiver local oscillator signal properly slaved to the backward oscillator frequency.

Referring now to FIG. 3, it will be noted that the relationships depicted are largely self-explanatory. It was assumed in FIG. 3 that the frequency increment between adjacent beam pointing positions of Δθ was Δf (equal 15 mHz.). The phase comparator output assumes that the backward oscillator is smoothly driven between phase-lock points. Although this may not be literally true in a practical system, the phase comparator output curve on FIG. 3 depicts the limits of the signal at 16. Variations and modifications of the illustrated and described embodiments will suggest themselves to those skilled in this art, once the principles are understood.

What I claim is:

1. A system for generation of a program of radio frequencies for controlling the beam pointing angle of a frequency sensitive radar antenna array comprising:

a frequency controllable radio frequency generator for producing said radio frequencies in response to a variable frequency-controlling signal;

a transmission line energized at one end from said radio frequency generator, said transmission line being constructed to be a plurality of wavelengths in electrical length at frequencies within said program of microwave frequencies such that the energy at the other end of said transmission line traverses a predetermined increment of phase change for each change of desired frequency in said program of frequencies from said radio frequency generator;

phase detection means for phase comparing said energy at said other end of said transmission line with that of said radio frequency generator;

and means responsive to said phase detection means, for producing a correction signal for modifying said frequency-controlling signal, thereby to effect phase-lock loop control of said other end phase from said transmission line.

2. The invention set forth in claim 1, further defined in that said predetermined increment of phase change is 2π radians.

3. The invention set forth in claim 2 further defined in that said transmission line is defined as an extended path waveguide transmission line.

4. In a frequency-scanning radar which includes an antenna array having successive radiating elements energized from corresponding successive points along a first extended path waveguide transmission line to produce a radiated beam having a pointing angle as a function of frequency of microwave energy providing excitation for said array, the combination comprising:

a microwave generator for producing said microwave energy in the frequency band of interest, said generator being frequency controllable in response to stepped variable frequency-controlling signals;

a second extended path waveguide transmission line connected to receive energy at its input from said microwave generator; said second transmission line being a plurality of wavelengths in electrical length of said second transmission line further being such that a frequency change therein sufficient to produce an overall output phase change equal to 2π radians is the same frequency change which, applied to said first transmission line, produces a predetermined increment of beam pointing angle change from said antenna array;

programming means for generating and applying said variable frequency-controlling signals to said microwave generator for producing a predetermined pattern of successive stepped frequency variations of said microwave energy, each of said frequency steps corresponding substantially to a discrete beam-pointing angle;

and means for comparing the phase of energy from the input of said second transmission line with the output thereof to produce a correction control signal as a function of phase difference between said input and said output, and for applying said correction control signal to said microwave generator for modifying said microwave generator frequency to tend to produce phase coincidence between said second transmission line input and output.

5. The invention set forth in claim 4 further defined in that said first and second extended path waveguide transmission lines are in thermal communication with each other, thereby to substantially eliminate any change of said beam pointing angle corresponding to a discrete frequency of said microwave generator as a function of temperature.

6. The invention set forth in claim 5 further defined in that said microwave generator is a backward wave oscillator having a helix operable as a frequency-controlling element, said frequency controlling signals comprise a staircase voltage from said programming means, and means are included for mixing said staircase voltage and said correction control signal to form a composite control signal and for applying said composite signal to said helix to control the frequency of said backward wave oscillator.

7. The invention set forth in claim 5 further defined in that said means for comparing the phase of energy to produce a correction control signal as a function of phase difference comprises a Magic T hybrid having its inputs connected on each to the input and output ends of said second transmission line and the outputs of said Magic T are separately detected and amplitude compared to produce said correction control signal in bipolar form.

8. The invention set forth in claim 7 further defined in that a controllable phase shifter is inserted in series between said second transmission line output and the corresponding one of said Magic T inputs, thereby to introduce an offset in said radiated beam-pointing angle as a function of frequency.

9. The invention set forth in claim 8 further defined in that said phase shifter is defined as being electrically controllable over an angle not exceeding $2\pi$ radians whereby said beam-pointing angle may be varied by a preselected fraction of a beam width by controlling said phase shifter in the period between successive occurrences of said successive stepped frequency variations of said microwave energy.

10. The invention set forth in claim 4 in which said first and second extended path transmission lines are defined as serpentine waveguides folded to provide an extended electrical length per unit of overall length.